United States Patent
Tsai et al.

[11] Patent Number: 6,037,260
[45] Date of Patent: Mar. 14, 2000

[54] POLISHING COMPOSITION

[75] Inventors: Ming-Shyong Tsai, Tainan Hsien; Li-Mei Chen, Hsinchu; Yue-Chin Yeh; Chiu-Chih Hsieh, both of Taipei; Ying-Tsung Chen, Chiayi, all of Taiwan

[73] Assignees: Industrial Technology Research Institute, Hsinchu; Chang Chun Petrochemical Corporation, Taipei; China Steel Corporation, Kaohsiung; Union Petrochemical Corporation, Taipei; A-Green Corporation, Kaohsiung Hsein; China Petrochemical Development Corporation, Taipei; Wah Hing Industrial Corporation; Eternal Chemical Corporation, both of Kaohsiung; Chinese Petroleum Corporation, Taipei, all of Taiwan

[21] Appl. No.: 09/076,116

[22] Filed: May 12, 1998

[30] Foreign Application Priority Data

Feb. 20, 1998 [TW] Taiwan ................... 87102458

[51] Int. Cl.$^7$ .................................................. C07K 13/00
[52] U.S. Cl. ........................... 438/692; 438/693; 51/307; 51/309; 451/41; 451/28; 451/36; 29/90.01
[58] Field of Search ...................... 51/307, 309; 438/692, 438/693, FOR 119; 451/41, 28, 36; 29/90.01

[56] References Cited

U.S. PATENT DOCUMENTS

| 4,260,396 | 4/1981 | Glemza ...................................... 51/278 |
| 4,475,981 | 10/1984 | Rea ........................................... 156/636 |
| 4,956,015 | 9/1990 | Okajima et al. ............................. 106/3 |
| 5,527,423 | 6/1996 | Neville et al. ......................... 136/636.1 |
| 5,693,239 | 12/1997 | Wang et al. ............................... 216/88 |
| 5,759,917 | 6/1998 | Grover et al. ............................ 51/309 |

FOREIGN PATENT DOCUMENTS

WO 97/13889  4/1997  WIPO .

OTHER PUBLICATIONS

Kirk–Othmer "Encyclopedia of Chemical Technology" $3^{rd}$ Edition, vol. 2, Alkoxides, Metal to Antibiotics (Peptides), pp. 225 and 227, 1978.

Primary Examiner—C. Melissa Koslow
Attorney, Agent, or Firm—Sughrue, Mion, Zinn Macpeak & Seas, PLLC

[57] ABSTRACT

The present invention provides a polishing composition which comprises 100 weight part of water; 0.5 to 20 weight part of boehmite, a hydroxide of aluminum, pseudoboehmite or mixtures thereof; 1 to 50 weight part of aluminum oxide ($Al_2O_3$); and 1 to 20 weight part of an acidic solution. The polishing composition of the present invention is a thixotropic fluid and displays satisfactory suspension properties. Therefore, it is very suitable for use as a polishing slurry.

21 Claims, 4 Drawing Sheets

POLISHING COMPOSITION

BACKGROUND OF THE INVENTION

1. Field of the Invention

The present invention relates to a composition having non-Newtonian fluid behavior, and more particularly relates to a composition having thixotropic fluid behavior, which is suitable for use as a polishing solution.

2. Description of the Prior Art

With the progress of IC (integrated circuit) design and fabrication, chemical mechanical polishing (CMP) techniques have gradually become widely utilized in the process for manufacturing semiconductors having a line width of less than 0.35 $\mu$m. In the chemical mechanical polishing process, the suspension of a polishing slurry is very critical to its application. That is, the suspension of the polishing slurry or its shelf life is dependent upon the dispersion of the particles in the polishing slurry. However, because of gravity, it is very difficult to suspend the abrasive material, such as aluminum oxide ($Al_2O_3$), in the polishing slurry in a stable state.

U.S. Pat. No. 5,527,423 to Cabot Corporation discloses a polishing slurry of improved dispersion and suspension properties, which includes a surfactant. The incorporated surfactant can be a nonionic, anionic, cationic, or amphoteric surfactant. Representative examples of the surfactants include polyalkyl siloxanes, polyaryl siloxanes, and polyoxyalkylene ethers.

U.S. Pat. No. 5,693,239 and WO 97/13889 disclose a method for increasing the polishing efficiency of the polishing slurry by incorporating other different forms of particles into 1–50% of $\alpha$-$Al_2O_3$. The incorporated particles can be aluminum hydrates, aluminum hydroxide, $\gamma$-alumina, $\delta$-alumina, amorphous alumina, or amorphous silica. Neither surfactants nor soluble polymers are used.

U.S. Pat. No. 4,260,396 discloses a polishing composition for polishing silicon and germanium, which includes $SiO_2$ and surfactants such as water soluble carboxypolymethylene gum and xanthum gum.

U.S. Pat. No. 4,475,981 discloses a method for polishing the Ni metal surface of a hard disc. The first step involves polishing the metal surface by a polishing slurry including $Al_2O_3$ or $CeO_2$ particles, Silconox Lap. as the dispersant, and hypochlorite as the oxidizing agent. The second step uses aluminum sol as a finer polishing agent to polish the metal surface.

In the above-mentioned conventional polishing slurries, the improvement to the suspension of particles in the liquid is achieved by incorporating surfactants or soluble polymers. However, the suspension of the particles is not satisfactory, foams will be generated in the process, and the incorporated surfactants or soluble polymers are actually deemed as contaminants in the high purity IC process. In addition, in some conventional slurries in which neither surfactants nor soluble polymers are incorporated, the suspension of the particles is also not satisfactory.

SUMMARY OF THE INVENTION

Therefore, the object of the present invention is to solve the above-mentioned problems and to provide a composition having non-Newtonian fluid behavior. Such a composition has thixotropic property, which is suitable for use as the polishing slurry for chemical mechanical polishing in the IC process. No surfactants are needed, no foams are generated, and the shelf life of the polishing composition is very long.

To achieve the object of the present invention, the polishing composition comprises:

100 weight part of water;

0.5 to 20 weight part of boehmite, a hydroxide of aluminum, pseudoboehmite or mixtures thereof;

1 to 50 weight part of aluminum oxide ($Al_2O_3$); and 1 to 20 weight part of an acidic solution.

The inventors of the present invention found that by incorporating suitable acidic material, the behavior of boehmite, a hydroxide of aluminum, pseudoboehmite or mixtures thereof can be altered into that of a thixotropic substance. In the static state, an attraction force is generated between particles in a slurry. Applying a shear force can yield the attraction force between particles. But when the shear force decreases, the attraction force between particles is not restored immediately. The behavior can be shown clearly in the figure of shear rate vs. shear stress. When shear rate increases, the shear stress is larger than that of the slurry when shear rate decreases. Such slurry is called a thixotropic fluid. When a thixotropic fluid is in the static state, the slurry can be a stable suspension due to the interaction force between particles. As the slurry is subjected to a shear force and starts flowing, the interaction force between particles is yielded by the shear force and will not be restored immediately, therefore, the slurry has a lower viscosity during flowing, which is suitable for use as a polishing slurry.

Further applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTIONS OF THE DRAWINGS

DETAILED DESCRIPTIONS OF THE INVENTION

According to the present invention, the polishing composition includes 100 weight part of water; 0.5 to 20 weight part of boehmite, a hydroxide of aluminum, pseudoboehmite or mixtures thereof; 1 to 50 weight part of aluminum oxide ($Al_2O_3$); and 1 to 20 weight part of an acidic solution.

The polishing composition of the present invention can contain boehmite, a hydroxide of aluminum, pseudoboehmite or mixtures thereof. Since the chemical composition of the boehmite, a hydroxide of aluminum, pseudoboehmite is relatively equivalent to that of the abrasive material $Al_2O_3$, the incorporation of boehmite, a hydroxide of aluminum, pseudoboehmite or mixtures thereof will not contaminate the polishing slurry.

The main object of the present invention, is to stabilize the suspension properties of the slurry by altering the rheology of the polishing slurry into that of a thixotropic substance. Therefore, all the aluminum oxides that can be dispersed in an organic acid or inorganic acid can be used in the present invention, such as α phase aluminum oxide, θ phase aluminum oxide, δ phase aluminum oxide, γ phase aluminum oxide, and mixtures thereof. The shape of the aluminum oxide can be in the form of spherical, stick, or irregular particles. The shape of the aluminum oxide can also be a mixture of any two or three of spherical, stick, or irregular forms. Preferably, the aluminum oxide has a specific surface area of from 5 $m^2/g$ to 350 $m^2/g$ and a primary particle size of less than 0.5 $\mu$m. According to the present invention, the acidic solution used can be of organic acid solution or inorganic acid solution, such as nitric acid, hydrochloric acid, acetic acid, sulfuric acid, phosphoric acid, and mixtures thereof. Preferably, the obtained polishing slurry has a pH value of less than 4.

According to the present invention, the solid content of the polishing composition is 2–10 wt %. The shelf life of the polishing composition of the present invention is longer than eight months. When the polishing composition of the present invention is applied to chemical mechanical polishing aluminum, the polishing rate can reach 4000 Å/min, with an unevenness of less than 5%.

Preferably, the polishing composition of the present invention includes 1 to 7 weight part of boehmite, a hydroxide of aluminum, pseudoboehmite or mixtures thereof, 1 to 20 weight part of aluminum oxide, and 1 to 5 weight part of the acidic solution.

The polishing slurry of the present invention is suitable for use in chemical mechanical polishing not only for planarizing a semiconductor, but also for processing fine glasses, metal films, and fine ceramics.

The following examples are intended to more fully illustrate the process and the advantages of the present invention without limiting its scope, since numerous modifications and variations will be apparent to those skilled in the art.

EXAMPLE 1

Figure 1:
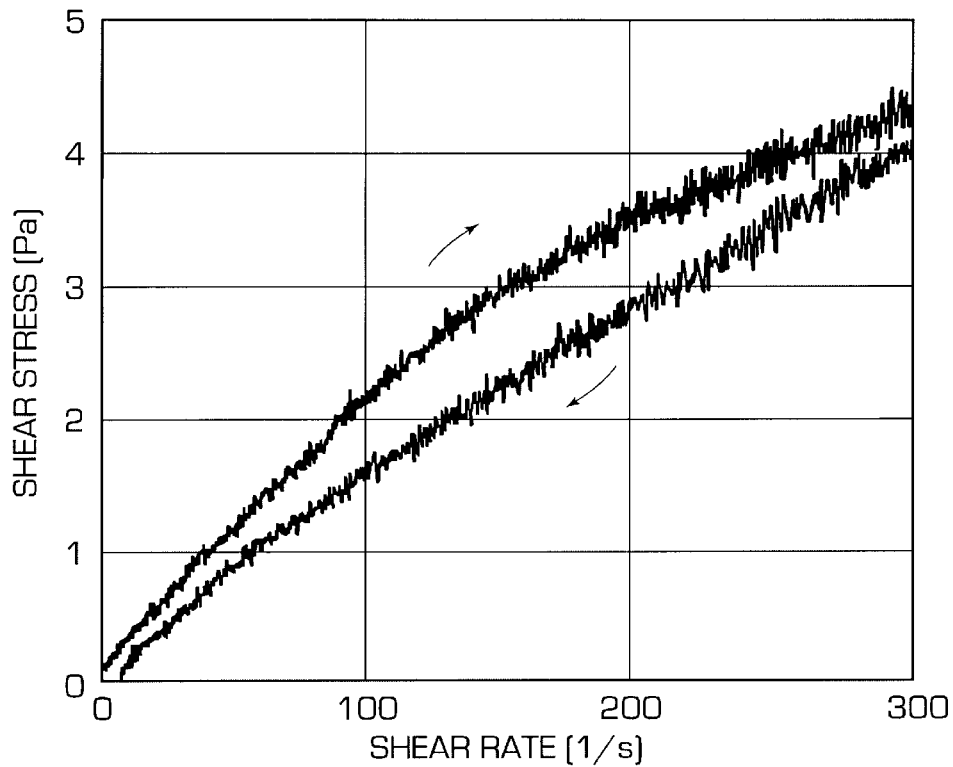
FIG. 1 is the shear stress versus shear rate curve of the polishing composition of Example 1.

60 g of boehmite was added to 2000 mL of deionized water. Then, 1.9 wt % of nitric acid was added. After thorough stirring, 256 g of θ-$Al_2O_3$ was added. The obtained slurry was adjusted to pH 3.5. The thixotropic behavior of the slurry is shown in FIG. 1, indicating that the obtained slurry displays satisfactory suspension properties.

It can be seen that when the shear rate gradually increases, the shear stress increases. However, when the shear rate gradually decreases, the shear stress decreasing curve is not identical to, but smaller than, the original shear stress increasing curve. This indicates that the slurry of this example displays thixotropic fluid behavior.

EXAMPLE 2

Figure 2:
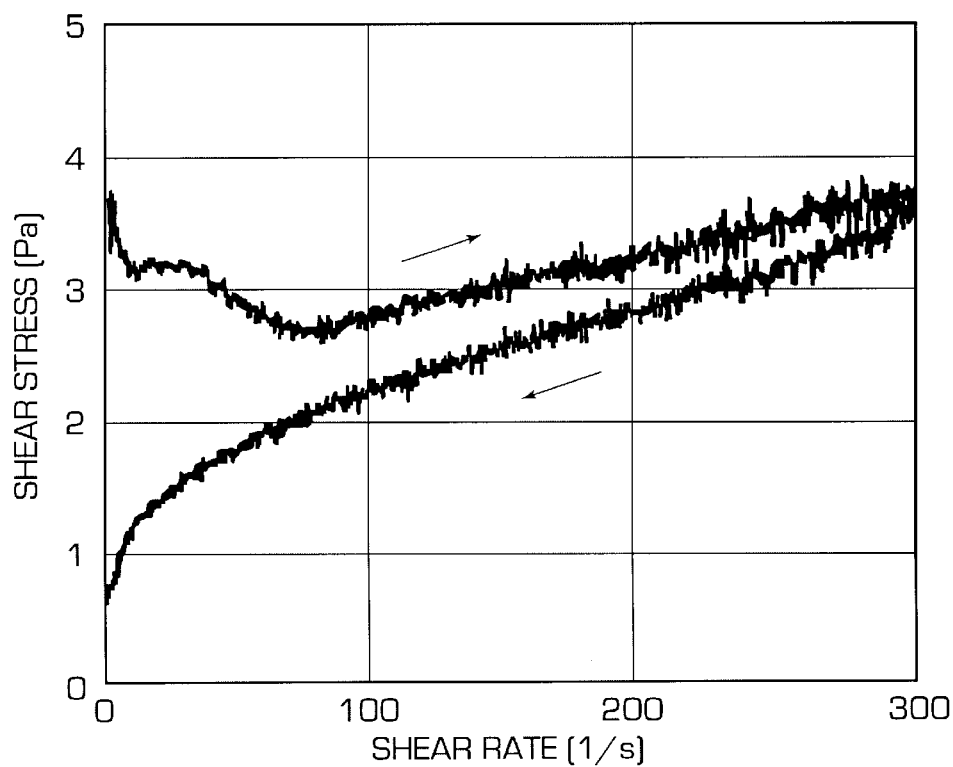
FIG. 2 is the shear stress versus shear rate curve of the polishing composition of Example 2.

80 g of boehmite was added to 2000 mL of deionized water. Then, 1 wt % of nitric acid was added. After thorough stirring, 120 g of δ-$Al_2O_3$ was added. The obtained slurry was adjusted to pH 3.5. The thixotropic behavior of the slurry is shown in FIG. 2, indicating that the obtained slurry displays satisfactory suspension properties.

EXAMPLE 3

Figure 3:
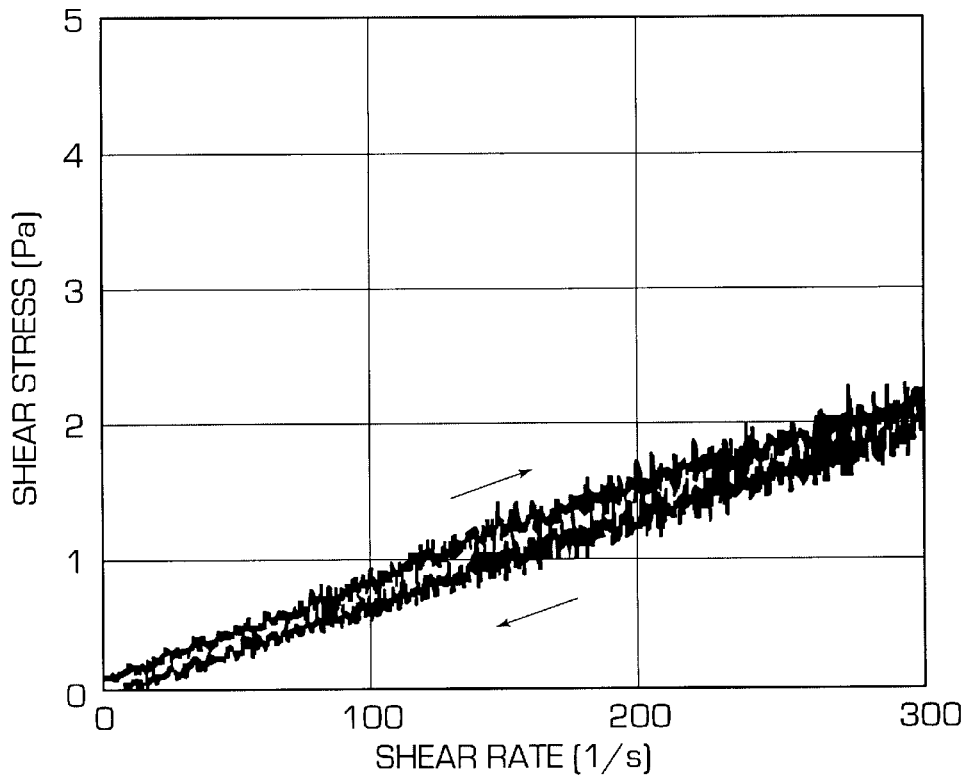
FIG. 3 is the shear stress versus shear rate curve of the polishing composition of Example 3.

50 g of boehmite was added to 2000 mL of deionized water. Then, 1 wt % of nitric acid was added. After thorough stirring, 100 g of γ-$Al_2O_3$ was added. The obtained slurry was adjusted to pH 3.5. The thixotropic behavior of the slurry is shown in FIG. 3, indicating that the obtained slurry displays satisfactory suspension properties.

EXAMPLE 4

Figure 4:
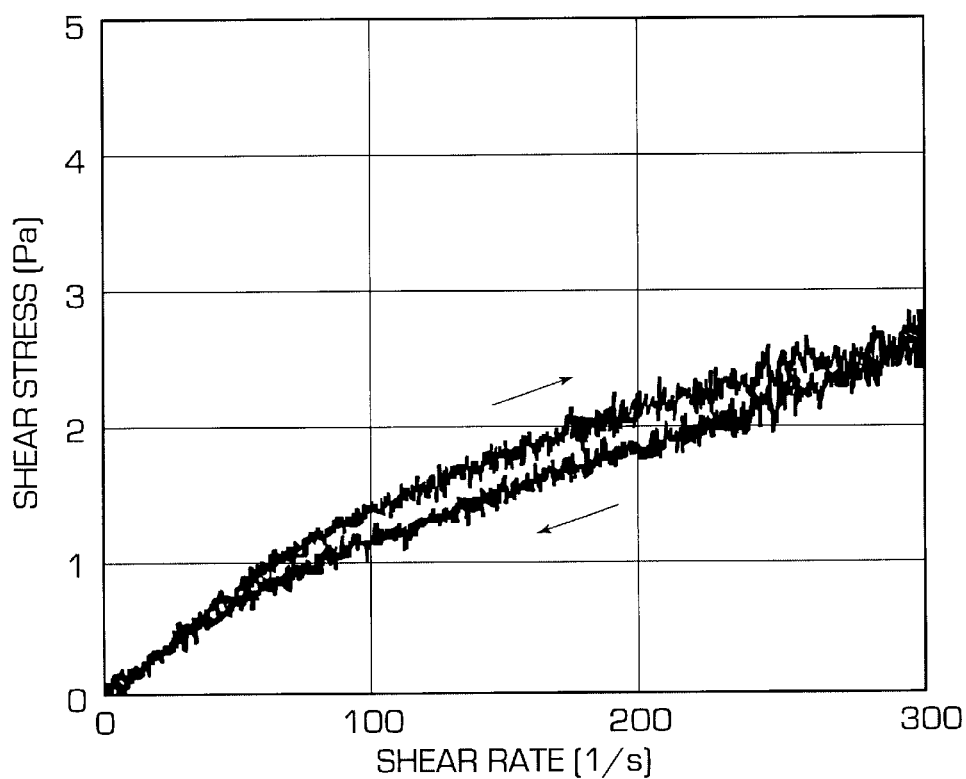
FIG. 4 is the shear stress versus shear rate curve of the polishing composition of Example 4.

30 g of boehmite was added to 2000 mL of deionized water. Then, 1.25 wt % of phosphoric acid was added. After thorough stirring, 90 g of γ-$Al_2O_3$ was added. The obtained slurry was adjusted to pH 4. The thixotropic behavior of the slurry is shown in FIG. 4, indicating that the obtained slurry displays satisfactory suspension properties.

EXAMPLE 5

Figure 5:
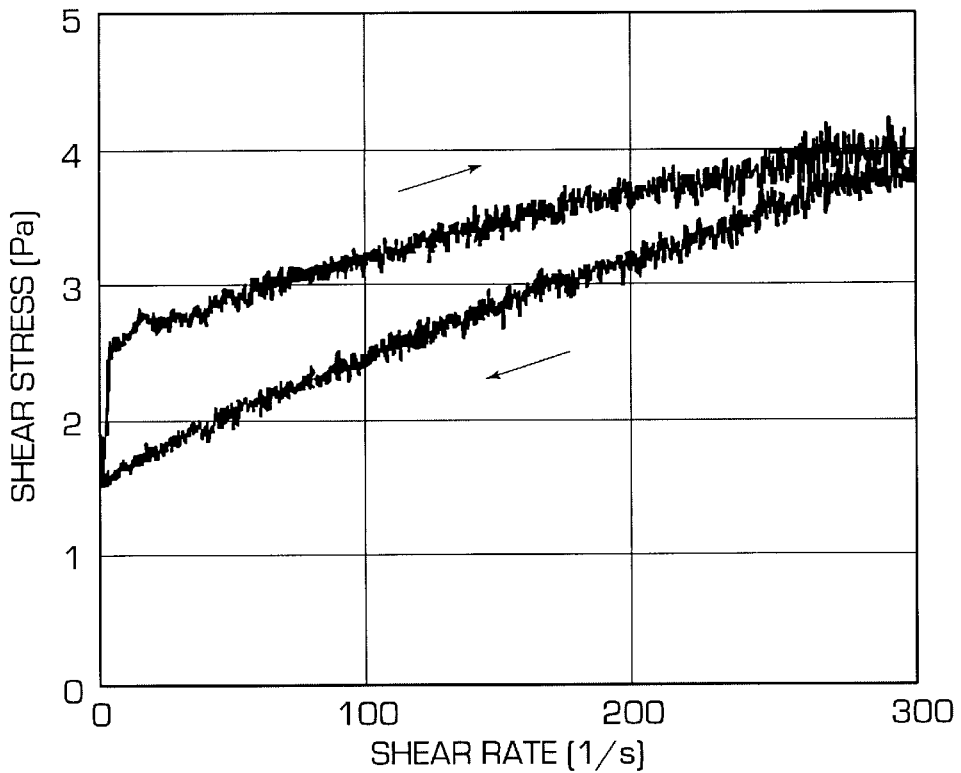
FIG. 5 is the shear stress versus shear rate curve of the polishing composition of Example 5.

25 g of boehmite was added to 2000 mL of deionized water. Then, 1 wt % of phosphoric acid was added. After thorough stirring, 30 g of γ-$Al_2O_3$ was added. The obtained slurry was adjusted to pH 3. The thixotropic behavior of the slurry is shown in FIG. 5, indicating that the obtained slurry displays satisfactory suspension properties.

EXAMPLE 6

Figure 6:
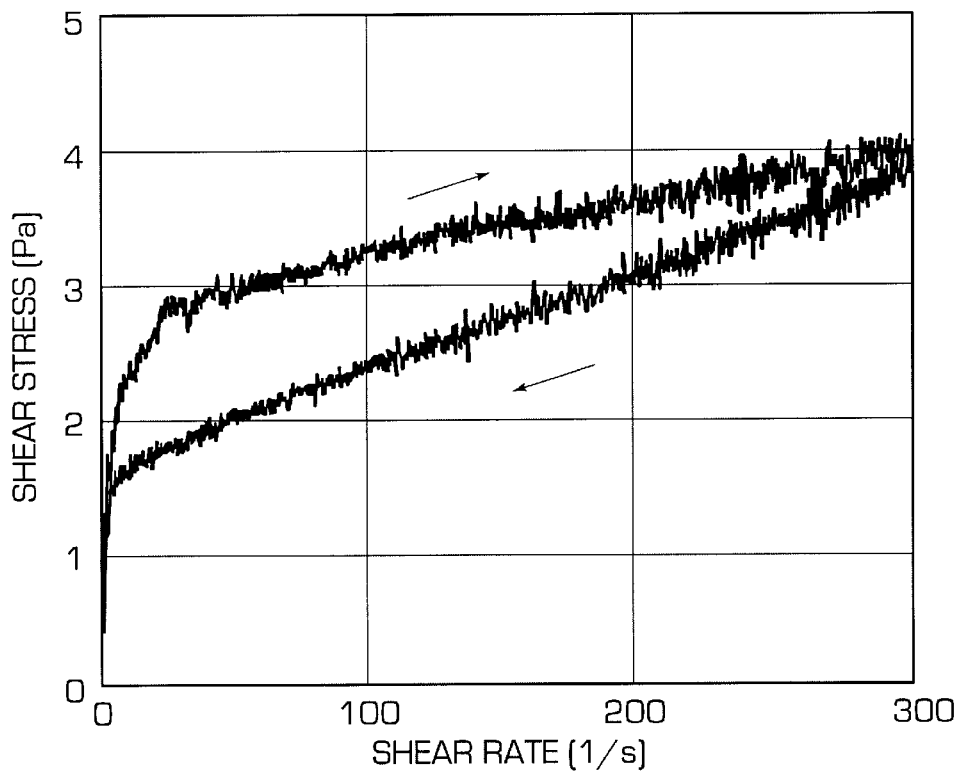
FIG. 6 is the shear stress versus shear rate curve of the polishing composition of Example 6.

60 g of boehmite was added to 2000 mL of deionized water. Then, 0.5 wt % of sulfuric acid was added. After thorough stirring, 140 g of γ-$Al_2O_3$ was added. The obtained slurry was adjusted to pH 3.5. The thixotropic behavior of the slurry is shown in FIG. 6, indicating that the obtained slurry displays satisfactory suspension properties.

EXAMPLE 7

Figure 7:
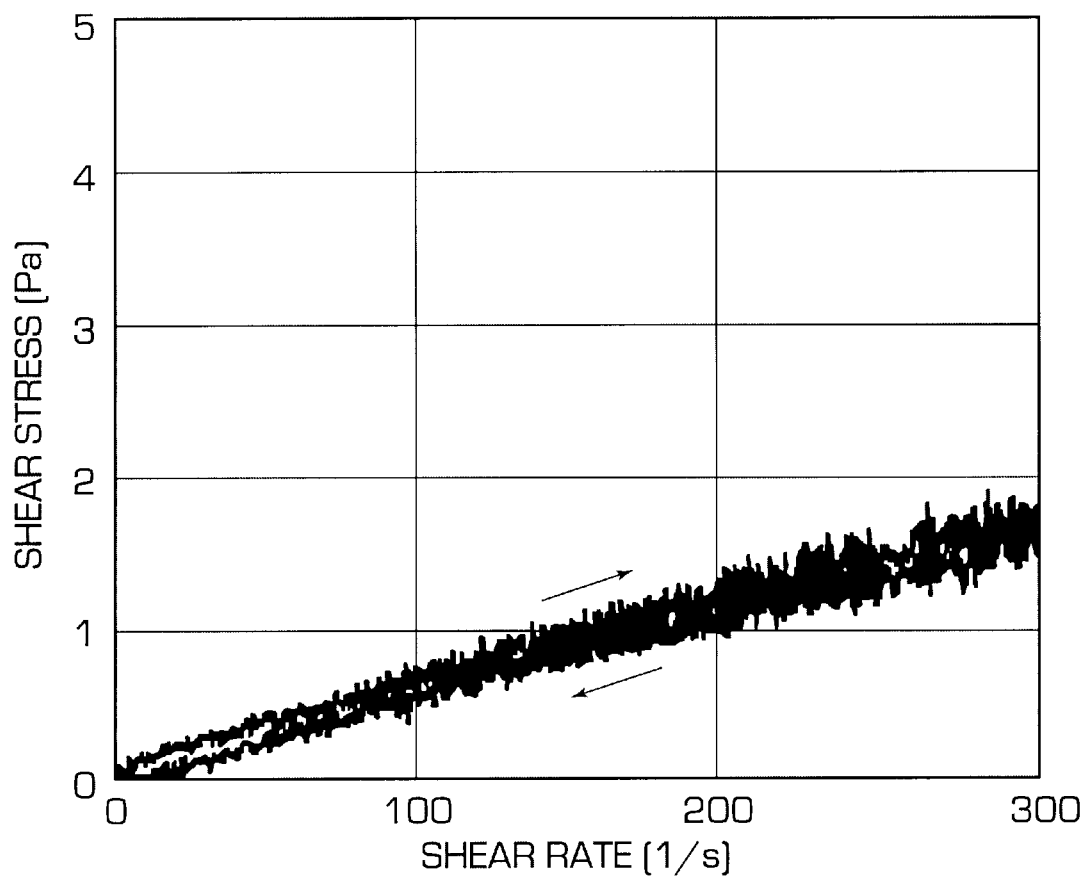
FIG. 7 is the shear stress versus shear rate curve of the polishing composition of Example 7.

50 g of boehmite was added to 2000 mL of deionized water. Then, 1 wt % of nitric acid was added. After thorough stirring, 100 g of α-$Al_2O_3$ was added. The obtained slurry was adjusted to pH 3.5. The thixotropic behavior of the slurry is shown in FIG. 7, indicating that the obtained slurry displays satisfactory suspension properties.

What is claimed is:

1. A polishing composition comprising:
   100 weight part of water;
   0.5 to 20 weight part of boehmite, a hydroxide of aluminum, pseudoboehmite or mixtures thereof;
   1 to 50 weight part of aluminum oxide ($Al_2O_3$) selected from the group consisting of θ phase aluminum oxide, δ phase aluminum oxide, γ phase aluminum oxide, and mixtures thereof;
   and 1 to 20 weight part of an acidic solution.

2. The polishing composition as claimed in claim 1, wherein the aluminum oxide has a specific surface area of from 5 $m^2/g$ to 350 $m^2/g$ and a primary particle size of less than 0.5 $\mu$m.

3. The polishing composition as claimed in claim 2, wherein the aluminum oxide is in the form of spherical particles.

4. The polishing composition as claimed in claim 2, wherein the aluminum oxide is in the form of stick particles.

5. The polishing composition as claimed in claim 2, wherein the aluminum oxide is in the form of irregular particles.

6. The polishing composition as claimed in claim 2, wherein the shape of the aluminum oxide is a mixture of any two or three of spherical, stick, or irregular forms.

7. The polishing composition as claimed in claim 1, wherein the acidic solution is an organic acid solution or inorganic acid solution.

8. The polishing composition as claimed in claim 7, wherein the acidic solution is selected from the group consisting of nitric acid, hydrochloric acid, acetic acid, sulfuric acid, phosphoric acid, and mixtures thereof.

9. The polishing composition as claimed in claim 1, which has a pH value of less than 4.

10. The polishing composition as claimed in claim 1, which comprises 1 to 7 weight part of boehmite, a hydroxide of aluminum, pseudoboehmite or mixtures thereof.

11. The polishing composition as claimed in claim 1, which comprises 1 to 20 weight part of aluminum oxide.

12. The polishing composition as claimed in claim 1, which comprises 1 to 5 weight part of the acidic solution.

13. The polishing composition as claimed in claim 1, wherein the composition contains boehmite.

14. The polishing composition as claimed in claim 1, wherein the composition contains a hydroxide of aluminum.

15. The polishing composition as claimed in claim 1, wherein the composition contains pseudoboehmite.

16. The polishing composition as claimed in claim 1, wherein the composition contains a mixture of any two or three of boehmite, a hydroxide of aluminum, and pseudoboehmite.

17. A method of planarizing a semiconductor, comprising using a polishing composition as a polishing slurry for polishing, wherein the polishing composition comprises:

100 weight part of water;

0.5 to 20 weight part of boehmite, a hydroxide of aluminum, pseudoboehmite or mixtures thereof;

1 to 50 weight part of aluminum oxide ($Al_2O_3$) selected from the group consisting of $\theta$ phase aluminum oxide, $\delta$ phase aluminum oxide, $\gamma$ phase aluminum oxide, and mixtures thereof;

and 1 to 20 weight part of an acidic solution.

18. A method of processing a fine glass, comprising using a polishing composition as a polishing slurry for polishing, wherein the polishing composition comprises:

100 weight part of water;

0.5 to 20 weight part of boehmite, a hydroxide of aluminum, pseudoboehmite or mixtures thereof;

1 to 50 weight part of aluminum oxide ($Al_2O_3$) selected from the group consisting of $\theta$ phase aluminum oxide, $\delta$ phase aluminum oxide, $\gamma$ phase aluminum oxide, and mixtures thereof;

and 1 to 20 weight part of an acidic solution.

19. A method of processing a metal film, comprising using a polishing composition as a polishing slurry for polishing, wherein the polishing composition comprises:

100 weight part of water;

0.5 to 20 weight part of boehmite, a hydroxide of aluminum, pseudoboehmite or mixtures thereof;

1 to 50 weight part of aluminum oxide ($Al_2O_3$) selected from the group consisting of $\theta$ phase aluminum oxide, $\delta$ phase aluminum oxide, $\gamma$ phase aluminum oxide, and mixtures thereof;

and 1 to 20 weight part of an acidic solution.

20. A method of processing a fine ceramic, comprising using a polishing composition as a polishing slurry for polishing, wherein the polishing composition comprises:

100 weight part of water;

0.5 to 20 weight part of boehmite, a hydroxide of aluminum, pseudoboehmite or mixtures thereof;

1 to 50 weight part of aluminum oxide ($Al_2O_3$) selected from the group consisting of $\theta$ phase aluminum oxide, $\delta$ phase aluminum oxide, $\gamma$ phase aluminum oxide, and mixtures thereof;

and 1 to 20 weight part of an acidic solution.

21. A polishing composition comprising:

100 weight part of water;

0.5 to 20 weight part of boehmite, a hydroxide of aluminum, pseudoboehmite or mixtures thereof;

1 to 50 weight part of aluminum oxide ($Al_2O_3$);

and 1 to 5 weight part of an acidic solution.

* * * * *

UNITED STATES PATENT AND TRADEMARK OFFICE
CERTIFICATE OF CORRECTION

PATENT NO. : 6,037,260

DATED : March 14, 2000

INVENTOR(S) : Ming-Shyong Tsai, et al.

It is certified that error appears in the above-identified patent and that said Letters Patent is hereby corrected as shown below:

On the Title Page

[73] Assignees: Industrial Technology Research Institute, Hsinchu; Chang Chun Petrochemical Co., Ltd., Taipei; China Steel Corporation, Kaohsiung; Union Petrochemical Corporation, Taipei; A-Green Co., Ltd., Kaohsiung Hsein; China Petrochemical Development Corporation, Taipei; Wah Hong Industrial Corporation; Eternal Chemical Co., Ltd., both of Kaohsiung; Chinese Petroleum Corporation, Taipei, all of Taiwan.

Signed and Sealed this

Eighth Day of May, 2001

Attest:

NICHOLAS P. GODICI

*Attesting Officer*   *Acting Director of the United States Patent and Trademark Office*